March 3, 1970 P. O. GRUNE 3,498,331
VALVE
Filed Oct. 26, 1967 2 Sheets-Sheet 1
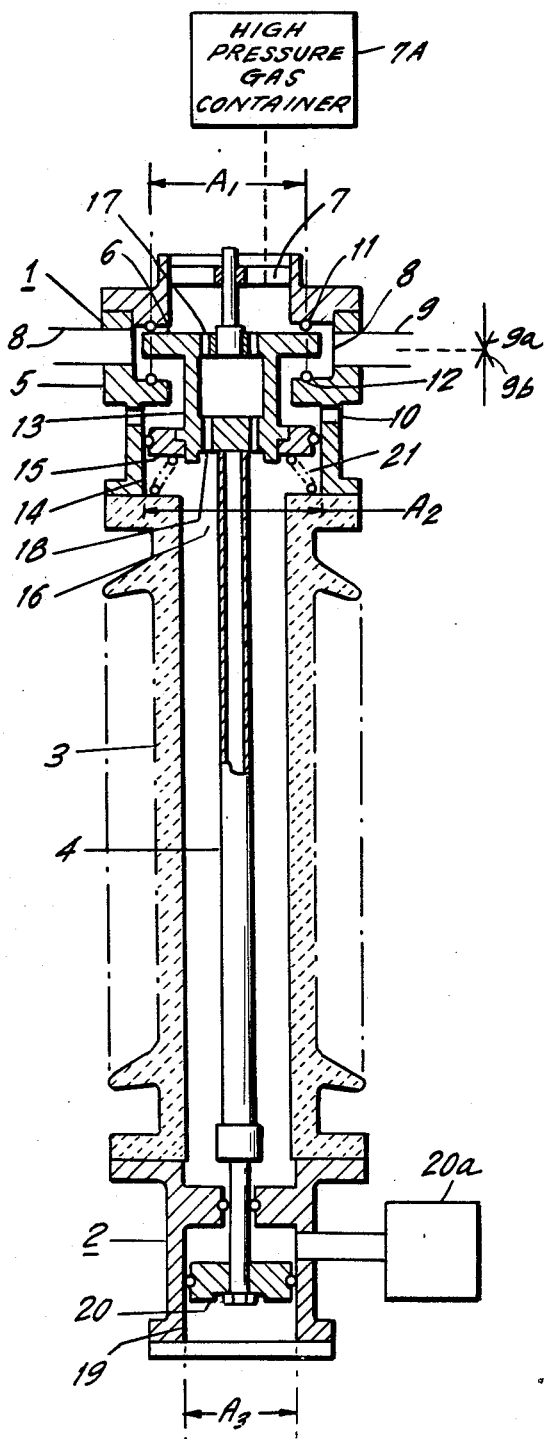
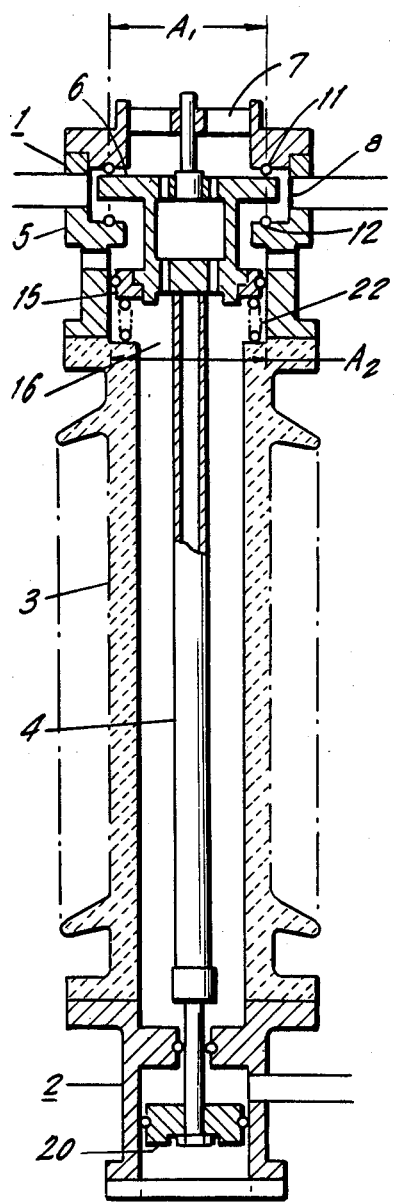

INVENTOR.
PER OLOF GRUNE

United States Patent Office 3,498,331
Patented Mar. 3, 1970

3,498,331
VALVE
Per Olof Grune, Ludvika, Sweden, assignor to Allmänna Svenska Elektriska Aktiebolaget, Vasteras, Sweden, a corporation of Sweden
Filed Oct. 26, 1967, Ser. No. 678,359
Claims priority, application Sweden, Oct. 28, 1966, 14,827/66
Int. Cl. F17d 1/04; F16k 17/10, 39/04
U.S. Cl. 137—625.66
4 Claims

ABSTRACT OF THE DISCLOSURE

A valve structure for controlling the flow of high pressure gas comprising a piston having opposing surfaces of generally equal area, exposed to the pressure being controlled; and a second piston connected to control pressures for moving the main piston.

BACKGROUND OF THE INVENTION

Field of the invention

This invention relates to a valve structure, and more particularly relates to a valve structure for controlling the high pressure gas of a high voltage circuit breaker.

The prior art

High voltage gas blast circuit breakers are well known to the art where, when the circuit breaker contacts are to be operated, a valve is opened to allow the connection of a high pressure gas to the contact region. The length of time required to operate the valve contributes to the operating time of the circuit breaker, and should be as short as possible. With presently used mechanisms, the valve release forces act directly against the relatively high pressure being controlled by the gas so that a relatively long time, or extremely high valve operating forces, are needed to operate the valve.

SUMMARY OF THE INVENTION

In accordance with the present invention, a novel valve structure is formed in which the movable valve member has opposing surfaces exposed to the high pressure being controlled. Thus, a relatively small operating force applied to this valve member can move the valve at high speed with relatively low operating forces.

Accordingly, a primary object of this invention is to form a high speed valve for control of high gas pressures.

Another object of this invention is to decrease the operating time of a high voltage gas blast circuit breaker.

A further object of this invention is to provide a novel high speed valve that can be mounted atop a high voltage insulator column, and be operable from the ground.

BRIEF DESCRIPTION OF THE DRAWINGS

These and other objects of this invention will become apparent from the following description when taken in connection with the drawings in which:

FIGURE 1 is a cross-sectional view of the novel valve of the invention as supported atop the end of a high voltage insulator column.

FIGURE 2 is similar to FIGURE 1 and shows the selection of a different differential operating area for the valve.

DESCRIPTION OF THE PREFERRED EMBODIMENTS

Figure 3:
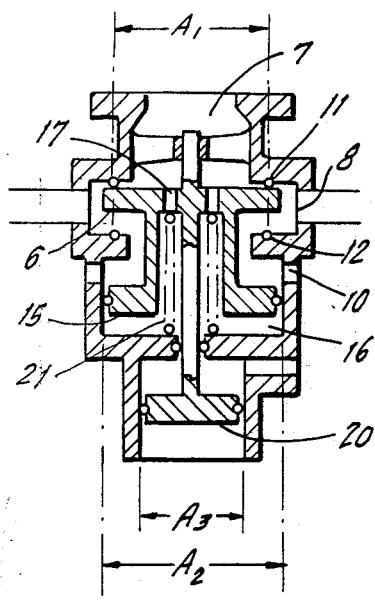
FIGURE 3 shows a cross-section view of a valve similar to the valve of FIGURE 1 when mounted directly on the operating mechanism.

Referring now to the FIGURE 1, there is shown a compressed gas valve 1 at high potential with respect to ground and adjacent an interrupter structure (not shown). The valve is operated from an operating device 2 positioned at earth potential which moves an operating rod 4 enclosed in a support insulator 3 filled with compressed gas. The valve 1 is a two-way valve having a valve housing 5 which contains a movable valve plate or member 6. The connection opening 7 of the valve is connected to a container schematically shown as container 7a which is at high potential and permanently filled with compressed gas. Openings 8 in housing 5 are connected, by means of conduits 9, to one or more breaking elements, contacts 9a–9b, for a gas blast circuit breaker. Openings 10 are formed in housing 5 through which the conduits 9 can be connected to open air. The valve member 6 is movable between sealing engagement with an upper valve seat 11 and a lower valve seat 12. In all figures, the valve member is shown in its upper position in which the conduits 9 are connected to the open air through the blow-out openings 10 and the main breaking gaps 9a–9b of the breaking elements are closed. The surface of valve member 6 facing away from the connection opening 7 has a cylindrical extension 13 which supports a piston 15. Piston 15 moves in a cylindrical chamber 14 formed in the valve housing 5. The chamber 16 within insulator 3 is limited at the top by the piston 15 and is in communication with the compressed gas container 7a by means of openings 17 and 18 in the valve member.

Instead of supplying compressed gas as shown to the space inside the support insulator 3 from said compressed gas container through the openings 17 and 18, it is possible to use the support insulator 3 as a pneumatic connection between a compressed gas source at earth potential (not shown) and said container at high potential. In this way, no separate connection is necessary.

The operating device 2 consists of a piston 20 movable in a cylinder 19. The lower side of the piston is permanently influenced by atmospheric pressure, whereas the cylindrical chamber above the piston can be connected to a source of high pressure air 20a or to the open air. The operating piston 20 is connected by means of an operating rod 4 of hollow, rigid insulation material to the movable valve member 6. The operating rod is tubular, and by means of openings (not shown), its interior is in communication with the surrounding chamber filled with compressed gas.

The valve seat 11 encircles an area $A_1$, the piston 15 encircles an area $A_2$ and the operating piston 20 encircles an area $A_3$. In the arrangement of FIGURE 1, the area $A_2$ is sufficiently larger than the area $A_1$ so that the sealing pressure required is obtained against the upper valve seat 11. A spring 21, received in the valve housing 5, also contributes to this pressure. Spring 21, however, could be eliminated. The valve is operated by placing the cylindrical chamber above the operating piston 20 under pressure. If this pressure is equal to the pressure of a source 7a, and since $A_3 > A_2 - A_1$, the valve member will be moved to its lower position with valve member 6 sealing against valve seat 12. The conduits 9 will then be placed under pressure from source 7a and the main breaking gaps of the breaking element will open in the usual manner.

To close the main breaking gaps, the cylindrical chamber above the operating piston 20 is connected to the open air and the valve means 6 is, therefore, moved to its upper end position since $A_2 > A_1$.

In the valve arrangement shown, FIGURE 2 is similar to that of FIGURE 1, except that the area $A_2$ of the piston 15 is equal to the area $A_1$ of the valve seat. Thus movement of valve 6 will be completely independent of the pressure of the compressed gas. The necessary sealing pressure is effected by means of a spring 22 arranged in the valve housing 5, which spring also acts as the closing spring. The valve is operated in the same way as the valve of FIGURE 1, by means of a piston 20, the cylindrical chamber being pressurized or evacuated, respectively. The operating pressure times the area $A_3$ of the operating piston must, therefore, be greater than the spring force of the spring 22.

Figure 4:
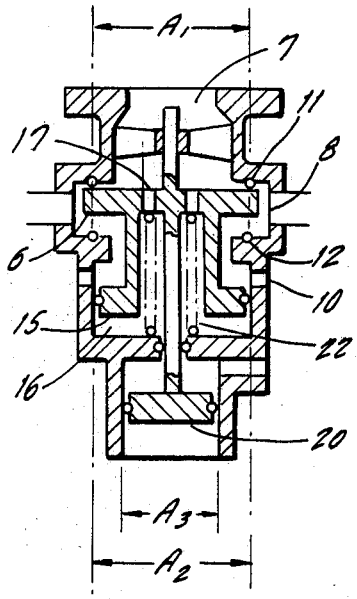
FIGURE 4 is similar to FIGURE 3 and shows the use of different areas for the valve surfaces.

The valves of FIGURES 1 and 2 are intended for gas blast circuit breakers for relatively high voltages, where the operating device 2 must be placed at a relatively great distance from the valve and the operating impulses between the operating device 2 at earth potential and the valve at high potential are transmitted through an insulation tube 4 enclosed in the pillar insulator 3 filled with compressed gas. If the operating device and valve are at the same potential, the operating device 2 may be built as a unit with the valve part as shown in FIGURES 3 and 4 which are identical to those shown in FIGURES 1 and 2, respectively, except for the interposed members 3 and 4 of FIGURES 1 and 2. Valves of the type shown in FIGURES 3 and 4 may advantageously be used for circuit breakers for lower voltages where the breaking elements at high potential are operated by control air from earth potential. The valves shown are then used as air control valves placed at earth potential.

The operating device including piston 20 of the valves shown in FIGURES 1–4 is one-way, since the driving means for the return of the valve is connected with the movable part of the valve itself. Alternatively, the operating device may be two-way, in which case it provides both the closing and opening operations and the sealing pressure against the appropriate valve seat. The valve is then made without a spring and with the area $A_1$ equal to the area $A_2$.

Figure 5:
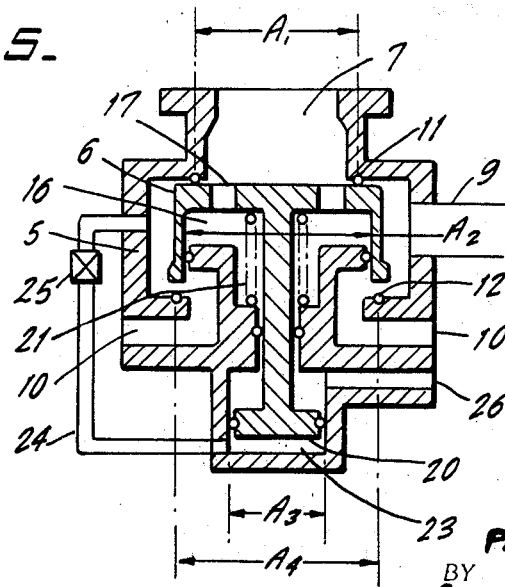
FIGURE 5 shows a cross-section view of a valve similar to the valve of FIGURE 3 which is self-sealing in both positions.

FIGURE 5 shows a valve which, similar to those in the other figures, is self-sealing at its upper end position, but is also seal-sealing at its lower end position. With this valve, the space connected to conduit 9 communicates with a chamber 23 limited by the underside of the operating piston 20, by means of a tube 24 in which a controlled air leak, or a throttle means 25, is arranged. The movable valve member 6 is shaped as a cylindrical cup, the internal cylindrical surface of which seals against a projecting collar part on the valve housing 5. Besides the areas $A_1$, $A_2$ and $A_3$ which are analogous with corresponding areas in the other figures, it should be noted that the lower valve seat 12 encircles an area $A_4$.

In the upper sealed position of the valve, the sealing pressure against the valve seat 11 is effected by the pressure on the surface $(A_2 - A_1)$ and by the spring 21. The spring is, in fact, not necessary, but may be suitable to provide the valve means with a certain directional force. The valve member is carried downwards to its other end position by placing the space above the operating piston 20 under pressure. If the operating gas is under the same pressure as the rest of the compressed gas system, which normally is the case, the piston surface area $A_3$ must be greater than the surface $(A_2 - A_1)$. When the valve member 6 has been moved down towards the lower valve seat, the gas presure on both sides of the operating piston 20 is equalized through the tube 24. Suitable time delay for this pressure equalization can be determined with the help of the throttling means 25. The sealing pressure against the lower valve seat 12 is then effected by the pressure on the surface $(A_4 - A_2)$. To close the main breaking gaps of the circuit breaker, the operating pressure is rapidly evacuated from the upper side of the operating piston 20 through the tube 26 and the remaining pressure on the other side of the piston 20 overcomes the downwardly directed pressure on the surface $(A_4 - A_2)$ and returns the valve member 6 to its upper end position, after which the tube 24 is evacuated through openings 10.

The embodiments of the invention which an exclusive privilege or property is claimed are defined as follows:

1. A valve structure comprising a hollow cylindrical valve body; an axially movable valve plate movable within said hollow cylindrical body; first and second axially spaced valve seats fixed within said valve body; said valve plate being movable between sealing engagement on its opposite surfaces with said first and second valve seats, respectively; cylindrical extension means connected to said plate; means to supply gas under pressure to the space within the first valve seat; piston means connected to the end of said extension means; the surface area of the bottom of said piston means being at least as large as the surface enclosed by said first valve seat; cylinder means formed within said hollow cylindrical body receiving said piston means; first opening means in said valve body communicating with said second valve seat; second opening means in said valve body between said first and second valve seats; said piston being disposed below said second valve seat; opening means extending through said valve plate whereby the pressure on top of said valve plate and the bottom of said piston can be equalized; and mechanical operating means connected to said valve plate for moving said plate between said first and second valve seats.

2. The valve structure as set forth in claim 1 which includes a hollow insulation column fixed to the ground; said valve structure mounted atop said hollow insulator; said operating means mounted at the bottom of said hollow insulator column.

3. The valve structure of claim 2 wherein said insulator column is hollow and filled with compressed gas.

4. The valve structure as set forth in claim 1 including spring biasing means for normally biasing said valve plate toward said first valve seat.

References Cited

UNITED STATES PATENTS

| 820,598 | 5/1906 | Petersen | 251—282 XR |
| 2,601,989 | 7/1952 | Modes | 251—282 XR |
| 2,615,466 | 10/1952 | Garde | 137—625.6 |

M. CARY NELSON, Primary Examiner

R. J. MILLER, Assistant Examiner

U.S. Cl. X.R.

137—625.27; 251—282